(12) United States Patent
Ng et al.

(10) Patent No.: US 9,043,448 B1
(45) Date of Patent: May 26, 2015

(54) SYSTEMS AND METHODS FOR CONFIGURING A NETWORK COMPONENT THAT INVOLVES TCAM

(75) Inventors: Qi Ming Ng, Santa Clara, CA (US);
Attila J. Hunyady, Saratoga, CA (US);
Ning Wang, San Jose, CA (US); Hung Nguyen, San Jose, CA (US)

(73) Assignee: GIGAMON INC., Santa Clara, CA (US)

( * ) Notice: Subject to any disclaimer, the term of this patent is extended or adjusted under 35 U.S.C. 154(b) by 24 days.

(21) Appl. No.: 13/466,361

(22) Filed: May 8, 2012

(51) Int. Cl.
*G06F 15/16* (2006.01)
*G06F 15/177* (2006.01)
*G06F 12/00* (2006.01)

(52) U.S. Cl.
CPC .................................... *G06F 15/177* (2013.01)

(58) Field of Classification Search
USPC ......... 709/203, 217–218, 220–221, 223–229, 709/250
See application file for complete search history.

(56) References Cited

U.S. PATENT DOCUMENTS

| | | | | |
|---|---|---|---|---|
| 6,252,872 | B1 * | 6/2001 | Tzeng | 370/360 |
| 7,424,018 | B2 | 9/2008 | Gallatin et al. | |
| 7,436,832 | B2 | 10/2008 | Gallatin et al. | |
| 7,440,467 | B2 | 10/2008 | Gallatin et al. | |
| 7,792,047 | B2 | 9/2010 | Gallatin et al. | |
| 8,346,743 | B2 * | 1/2013 | Pfuntner et al. | 707/702 |
| 2003/0039135 | A1 * | 2/2003 | Srinivasan et al. | 365/49 |
| 2004/0006738 | A1 * | 1/2004 | Szabo et al. | 715/513 |
| 2005/0102617 | A1 * | 5/2005 | Nagahara et al. | 715/517 |
| 2005/0287499 | A1 * | 12/2005 | Yeager | 434/127 |
| 2006/0041410 | A1 * | 2/2006 | Strebelle | 703/10 |
| 2006/0123393 | A1 * | 6/2006 | Atkins et al. | 717/121 |
| 2008/0162390 | A1 * | 7/2008 | Kapoor et al. | 706/20 |
| 2008/0189427 | A1 * | 8/2008 | Offermann | 709/229 |
| 2008/0199835 | A1 * | 8/2008 | Yeager | 434/127 |
| 2008/0309208 | A1 * | 12/2008 | Sherrod et al. | 312/223.2 |
| 2009/0144157 | A1 * | 6/2009 | Saracino et al. | 705/14 |
| 2009/0262745 | A1 | 10/2009 | Leong et al. | |
| 2011/0176544 | A1 * | 7/2011 | Wong et al. | 370/390 |
| 2011/0206055 | A1 * | 8/2011 | Leong | 370/401 |
| 2012/0311144 | A1 * | 12/2012 | Akelbein et al. | 709/224 |

FOREIGN PATENT DOCUMENTS

| | | | | |
|---|---|---|---|---|
| EP | 1329073 | * | 2/2005 | G06F 15/16 |
| EP | 1329073 | B1 | 2/2005 | |

OTHER PUBLICATIONS

International Search Report and Written Opinon dated Jul. 18, 2013 for PCT Application No. PCT/US2013/040178, 15 pages.

* cited by examiner

*Primary Examiner* — Zarni Maung
(74) *Attorney, Agent, or Firm* — Vista IP Law Group, LLP

(57) ABSTRACT

A method of configuring a network component includes providing a plurality of templates, each of which is selectable for configuring the network component, wherein each of the templates has a set of available attributes associated thereto and includes a plurality of entry groups, each of the entry groups including a plurality of entries for allowing network processing rules that involve one or more of the attributes to be entered. The method also includes receiving an input regarding a desired attribute to be considered in a network process, and selecting one of the templates for configuring the network component based on the received input, wherein the act of selecting is performed automatically using a processor.

60 Claims, 7 Drawing Sheets

| | 500a ipv4 | | 500b ipv4+mac | | 500c ipv4+uda | | 500d ipv6 | |
|---|---|---|---|---|---|---|---|---|
| 504 | mt | st/filter | mt | st/filter | mt | st/filter | mt | st/filter |
| ipv4 | x | x | x | x | x | x | | |
| ipv6 | | | | | | | x | x |
| mac | | | x | x | | | | |
| uda1 | n/a | | n/a | | n/a | x | n/a | |
| uda2 | n/a | | n/a | | n/a | x | n/a | |
| vlan | x | x | x | x | x | x | x | x |
| portdst | x | x | x | x | x | x | x | x |
| portsrc | x | x | x | x | x | x | x | x |
| ethertype | x | x | x | x | x | x | x | x |
| ipver | x | x | x | x | x | x | | x |
| protocol | x | x | x | x | x | x | | x |
| dscp | x | x | x | x | x | x | | x |
| tos | x | x | x | x | x | x | | x |
| tcpctl | x | x | x | x | x | x | | x |
| ipfr | x | x | x | x | x | x | | x |
| ttl | x | x | x | x | x | x | | x |
| ip6fl | n/a | | n/a | x | n/a | x | n/a | |
| slice 0 | 512 | 512 | 256 | | 512 | | | 256 |
| 1 | 512 | 512 | 256 | 512 | 512 | 512 | 512 | 256 |
| 2 | 512 | 512 | 256 | | 512 | | | 256 |
| 3 | 512 | 512 | 256 | 512 | 512 | 512 | 512 | 256 |
| 4 | n/a | 512 | n/a | | n/a | | n/a | 256 |
| 5 | n/a | 512 | n/a | 512 | n/a | 512 | n/a | 256 |
| 6 | n/a | 512 | n/a | | n/a | | n/a | 256 |
| 7 | n/a | 512 | n/a | 512 | n/a | 512 | n/a | 256 |
| 8 | n/a | 512 | n/a | | n/a | | n/a | 256 |
| 9 | n/a | 512 | n/a | 512 | n/a | 512 | n/a | 256 |
| 10 | n/a | 512 | n/a | | n/a | | n/a | 256 |
| 11 | n/a | 512 | n/a | 512 | n/a | 512 | n/a | 256 |
| 12 | n/a | 512 | n/a | | n/a | | n/a | 256 |
| 13 | n/a | 512 | n/a | 512 | n/a | 512 | n/a | 256 |
| 14 | n/a | 512 | n/a | | n/a | | n/a | 256 |
| 15 | n/a | 512 | n/a | 512 | n/a | 512 | n/a | 256 |
| # Entries | 2048 | 8192 | 1024 | 4096 | 2048 | 4096 | 1024 | 4096 |

▨▨▨ attributes/entries lost switching from template 500a
░░░ attributes gained switching from template 500a

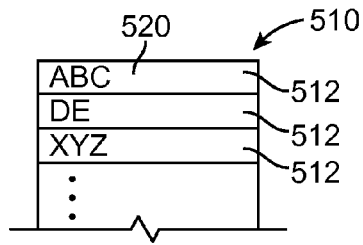

FIG. 5 ved input, wherein the act of selecting is performed automatically using a processor.

Other and further aspects and features will be evident from reading the following detailed description of the embodiments.

SYSTEMS AND METHODS FOR CONFIGURING A NETWORK COMPONENT THAT INVOLVES TCAM

FIELD

This application relates generally to network switch devices, and more specifically, to systems and methods for configuring network components in a network switch devices.

BACKGROUND

Network switches have been used to forward packets from one node to another node. Such network switch devices include a first network port for receiving packets from a first node, and a second network port for passing the packets to a second node. Some network switch devices may also include one or more instrument ports for transmitting packets to one or more instruments for monitoring network traffic.

A network switch device may include a network component configured to perform various functions. Applicant of the subject application has determined that a new system and method for configuring a network component would be desirable.

SUMMARY

In accordance with some embodiments, a method of configuring a network component includes providing a plurality of templates, each of which is selectable for configuring the network component, wherein each of the templates has a set of available attributes associated thereto and includes a plurality of entry groups, each of the entry groups including a plurality of entries for allowing network processing rules that involve one or more of the attributes to be entered. The method also includes receiving an input regarding a desired attribute to be considered in a network process, and selecting one of the templates for configuring the network component based on the received input, wherein the act of selecting is performed automatically using a processor.

In accordance with other embodiments, an apparatus for configuring a network component includes a non-transitory medium storing a plurality of templates, each of which is selectable for configuring the network component, wherein each of the templates has a set of available attributes associated thereto and includes a plurality of entry groups, each of the entry groups including a plurality of entries for allowing network processing rules that involve one or more of the attributes to be entered. The apparatus also includes a processor configured for receiving an input regarding a desired attribute to be considered in a network process, and selecting one of the templates for configuring the network component based on the received input.

In accordance with other embodiments, a computer product includes a non-transitory medium storing a set of instructions, an execution of which causes a process to be performed, the process comprising providing a plurality of templates, each of which is selectable for configuring the network component, wherein each of the templates has a set of available attributes associated thereto and includes a plurality of entry groups, each of the entry groups including a plurality of entries for allowing network processing rules that involve one or more of the attributes to be entered. The process also includes receiving an input regarding a desired attribute to be considered in a network process, and selecting one of the templates for configuring the network component based on

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

FIG. 5 illustrates other examples of templates for configuring a network component in accordance with other embodiments;

DESCRIPTION OF THE EMBODIMENTS

Figure 1:
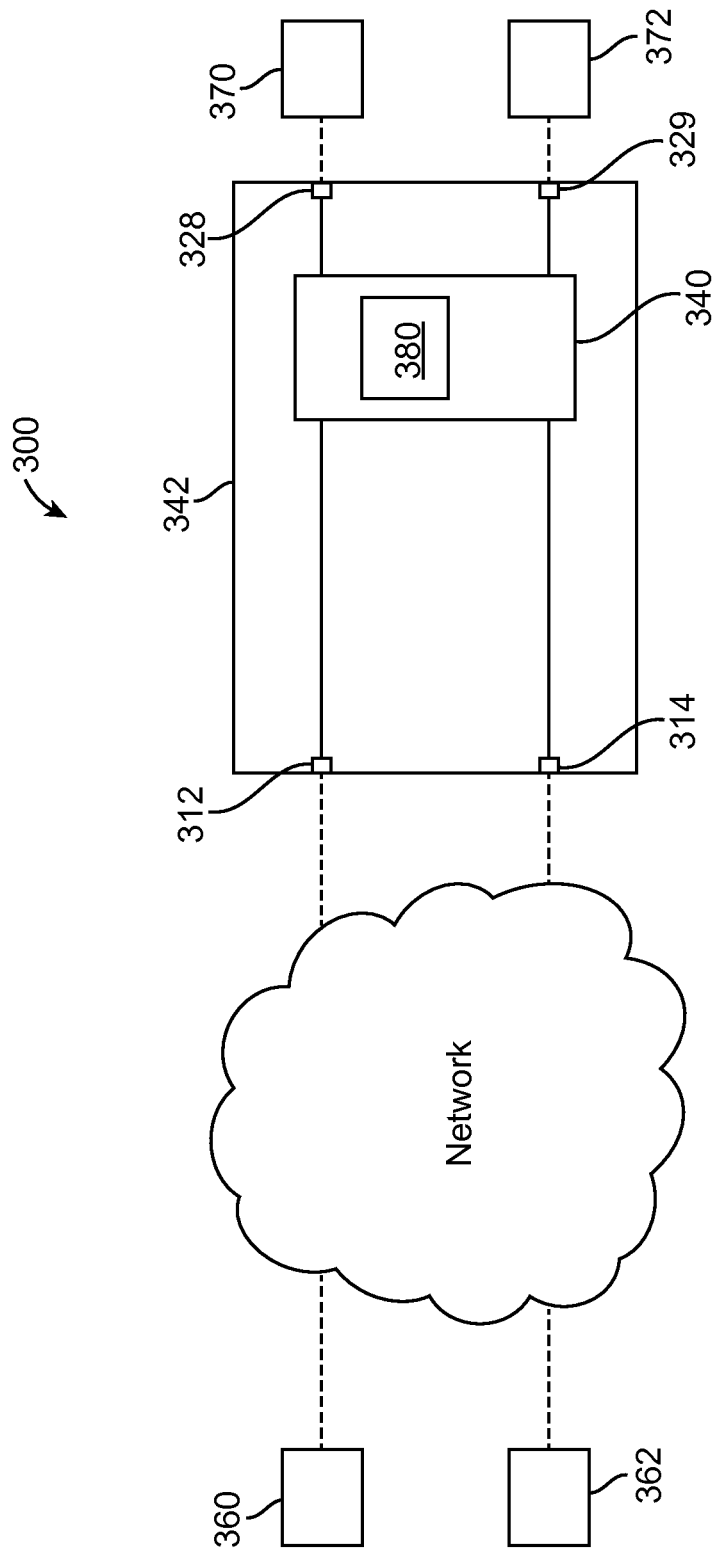
FIG. 1 illustrates a packet switch device in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

FIG. 1 illustrates a network switch device 300 in accordance with some embodiments. The network switch device 300 includes a first network port 312, a second network port 314, a first instrument port 328, and a second instrument port 329. The device 300 also includes a packet switch 340, and a network switch housing 342 for containing the packet switch 340. In the illustrated embodiments, the device 300 also includes other components, such as a Network PHY (not shown) coupled to each of the respective ports 312, 314, wherein the Network PHYs may be considered to be parts of the packet switch 340. Alternatively, the Network PHYs may be considered to be components that are separate from the integrated circuit 340. The PHY is configured to connect a link layer device to a physical medium such as an optical fiber, copper cable, etc. In other embodiments, instead of the PHY, the device 300 may include an optical transceiver, or a SERDES, etc. The housing 342 allows the device 300 to be carried, transported, sold, and/or operated as a single unit. The ports 312, 314, 328, 329 are located at a periphery of the housing 342. In other embodiments, the ports 312, 314, 328, 329 may be located at other locations relative to the housing 342. Although two network ports 312, 314 are shown, in other embodiments, the device 300 may include more than two network ports. Also, although two instrument ports 328, 329 are shown, in other embodiments, the device 300 may include only one instrument port, or more than two instrument ports.

During use, the first network port 312 of the device 300 is communicatively coupled to a first node 360, and the second port 314 is communicatively coupled to a second node 362. The device 300 is configured to communicate packets between the first and second nodes 360, 362 via the network ports 312, 314. Also, during use, the instrument ports 328, 329 of the device 300 are communicatively coupled to respective instruments 370, 372. The instruments 370, 372 may be directly coupled to the device 300, or communicatively coupled to the device 300 through the network (e.g., Internet). In some cases, the device 300 is provided as a single unit that allows the device 300 to be deployed at a single point along a communication path. In the illustrated embodiments, the packet switch 340 is configured to receive packets from nodes 360, 362 via the network ports 312, 314, and process the packets in accordance with a predefined scheme. For example, the packet switch 340 may pass packets received from one or more nodes to one or more instruments that are connected to respective instrument port(s) 328, 329.

In one or more embodiments, the packet switch 340 may be any switch module that provides packet transmission in accordance with a pre-determined transmission scheme. In some embodiments, the packet switch 340 (e.g., one or more components, such as component 380, in the packet switch 340) may be user-configurable such that packets may be transmitted in a one-to-one configuration (i.e., from one network port to an instrument port). As used in this specification, the term "instrument port" refers to any port that is configured to transmit packets to an instrument, wherein the instrument may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, etc., or the instrument may be a pass-through device (i.e., it can receive packets, and transmit the packets back to the device 300 after the packets have been processed), such as an intrusion prevention system. In other embodiments, the packet switch 340 may be configured such that the packets may be transmitted in a one-to-many configuration (i.e., from one network port to multiple instrument ports). In other embodiments, the packet switch 340 may be configured such that the packets may be transmitted in a many-to-many configuration (i.e., from multiple network ports to multiple instrument ports). In further embodiments, the packet switch 340 may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the device 300 so that the packets (or certain types of packets) are routed according to any one of these configurations. In some embodiments, the packet movement configuration is predetermined such that when the device 300 receives the packets, the device 300 will automatically forward the packets to the ports based on the predetermined packet movement configuration (e.g., one-to-one, one-to-many, many-to-many, and many-to-one) without the need to analyze the packets (e.g., without the need to examine the header, determine the type of packets, etc.).

Examples of packet switch 340 that may be used to implement features described herein include any of the commercially available network switch devices, such as GigaVUE™, that is available at Gigamon LLC. Other examples of packet switch 340 that may be used to implement features described herein are described in U.S. patent application Ser. Nos. 12/148,481, 12/255,561, 11/123,273, 11/123,465, and 11/123,377, the entire disclosure of all of which is expressly incorporated by reference herein.

In accordance with some embodiments, the packet switch 340 may have the functionalities of a conventional packet switch except that it provides visibility into various parts of a network. Thus, embodiments of the packet switch 340 may operate like a conventional managed packet switch, but providing packet monitoring function. This is accomplished by configuring the packet switch 340 to operate as a circuit switch under certain circumstances. In some embodiments, the configuring of the managed packet switch may be performed by utilizing a CPU interface of the switch to modify appropriate registers in the switch to allow for the desired operation.

It should be noted that the packet switch 340 that may be used with the device 300 is not limited to the examples described above, and that other packet switches 340 with different configurations may be used as well. Also, in any of the embodiments described herein, the packet switch 340 may be implemented using an integrated circuit, such as a processor (e.g., a general purpose processor, a network processor, an ASIC processor, a FPGA processor, etc.).

In the illustrated embodiments, the network switch device 300 also includes a component (e.g., an integrated circuit) 380 for performing various network processing functions. In the illustrated embodiments, the integrated circuit 380 is illustrated as a component of the packet switch 340. In other embodiments, the integrated circuit 380 may be a separate component from the packet switch 340. The integrated circuit 380 may be implemented using a processor, such as a general processor, a network processor, an ASIC processor, a FPGA processor, etc. In some embodiments, the network component 380 may be processor, such as a field processor. In other embodiments, the network component 380 may be a network card. Also, in some embodiments, the network component 380 may include ternary content-addressable memory (TCAM). By means of non-limiting examples, the network component 380 may be a type StrataXGS family device, manufactured by Broadcom, at Irvine, Calif. The component 380 may be configured to perform various packet processing functions, included but not limited to packet filtering, packet routing, packet switching, packet mirroring, packet aggregation, etc.

Figure 2:
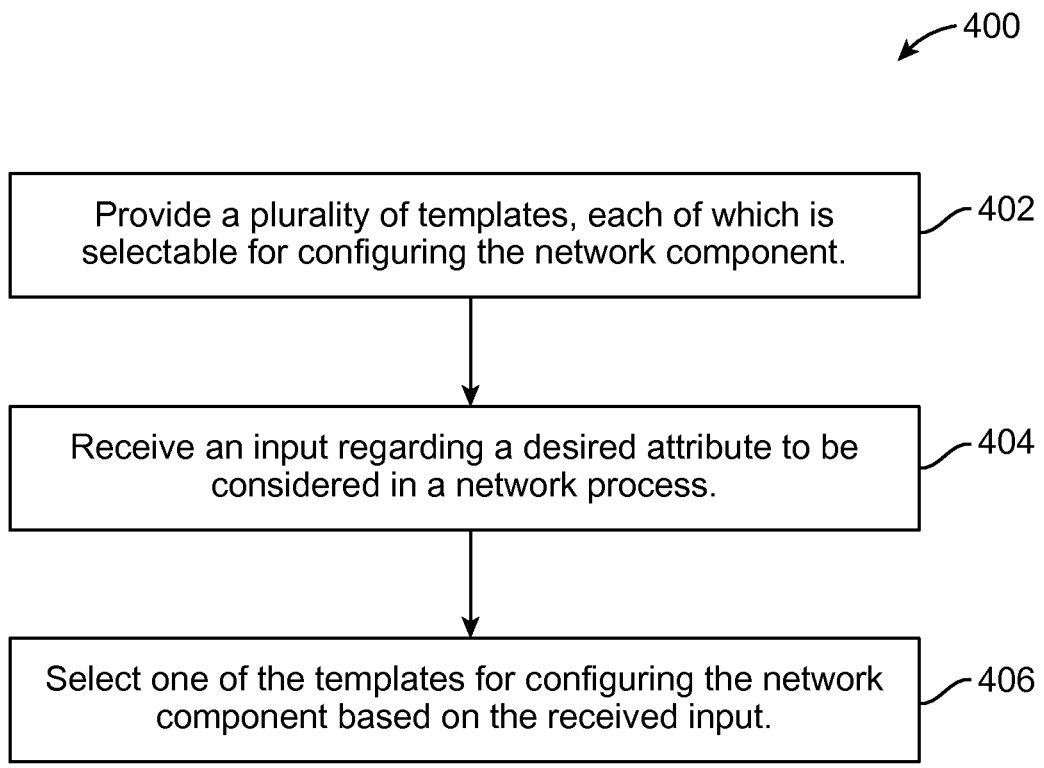
FIG. 2 illustrates a method of configuring a network component in accordance with some embodiments.

FIG. 2 illustrates a method 400 for configuring a network component in accordance with some embodiments. In some embodiments, the method 200 may be performed by the network switch device 300 (e.g., one or more components, such as a processor running on a software, in the network switch device 300) to configure the network component 380. First, a plurality of templates is provided by the network switch device 300, each of which is selectable for configuring the network component (Item 402). The templates may be considered as being provided by the network switch device 300 by being available for access. In some embodiments, the templates may be stored in a non-transitory medium in the network switch device 300. In other embodiments, the templates may be stored in a non-transitory medium that is communicatively coupled to the network switch device 300. In the illustrated embodiments, each of the templates has a set of available attributes associated thereto and includes a plurality of entry groups. Each of the entry groups including a plurality of entries for allowing network processing rules that involve one or more of the attributes to be entered, thereby configuring the network component 380.

Figure 3:
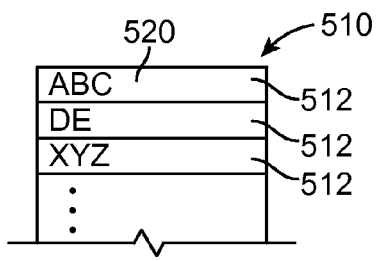
FIG. 3 illustrates examples of templates for configuring a network component in accordance with some embodiments.

FIG. 3 illustrates some templates 500a-500e in accordance with some embodiments. The templates 500a-500e may be examples of the templates referenced in Item 202. The templates 500a-500e may be provided for selection to configure a network component (e.g., the network component 380). Although five templates 500a-500e are shown, in other embodiments, there may be more than five templates or fewer than five templates. In the illustrated examples, the templates 500a-500e have respective names "ipv4", "ipv4+mac", "ipv4+uda", "uda", and "ipv6". In other embodiments, the templates 500a-500e may have other names that are different from the examples shown. In the illustrated embodiments, each of the templates 500a-500e are configured (e.g., programmed, designed, etc.) for allowing a set of functions to be programmed to the network component 380. The different set of functions that may be programmed to the component 380 using different respective templates 500 may have one or more overlapping functions, or may have completely different functions. For examples, one of the templates 500 may be configured to allow programming of the component 380 to perform only ipv4 processing of packets (e.g., processing that involves source ipv4 address and/or destination ipv4 address), and another one of the templates may be configured to allow programming of the component 380 to perform both ipv4 processing and ipv6 processing (e.g., processing that involves source ipv6 address and/or destination ipv6 address) of packets.

As shown in the figure, the template 500a includes a set 502 of available attributes 504 that are associated to the template 500a. The template 500a also includes a plurality of entry groups 510, wherein each of the entry groups 510 includes a plurality of entries 512 for allowing network processing rules 520 that involve one or more of the attributes 504 to be entered. In some embodiments, each entry group 510 may be considered a "slice".

In the illustrated example, the set of available attributes 504 includes ipv4, ipv6, mac, uda1, uda2, vlan, portdst, portsrc, ethertype, ipver, protocol, dscp, tos, tcpctl, ipfr, ttl, and ip6fl. The attributes related to L2 include macsrc (source MAC address), macdst (destination MAC address), vlan (vlan id or id range), and ethertype (Layer 2 ethernet type). The attributes related to L3 include protocol (internet protcol number), ipver (IP version number), dscp (DiffServ Code Point bits), ttl (time to live value or range), and tosval (type of service bits). The attributes related to L4 include portdst (destination port number or port range), portsrc (source port number or port range), and tcpctl (TCP protocol bits). The attributes related to IPv4 include ipsrc (source IPv4 address), ipdst (destination IPv4 address), and ipfrag (IP fragmentation bits). The attributes related to IPv6 include ip6src (source IPv6 address), ip6dst (destination IPv6 address), and ip6fl (IPv6 flow label). The attributes related to UDA include uda1-data (1st user defined pattern match), and uda2-data (2nd user defined pattern match).

It should be noted that the set of possible available attributes 504 is not limited to the examples shown, and that a template 500 may include other attribute(s). Also, in other embodiments, a template 500 may not need to include all of the attributes 504 shown.

In some embodiments, the attributes 504 for each of the templates 500a-500e are set (e.g., by the provider of the network switch device 300), and the user of the network switch device 300 will have no access and/or no ability to modify the attributes 504 for the different templates 500a-500e. For example, the provider of the network switch device 300 may create the templates 500a-500e by setting a list of attributes 504 for each template 500, and then store the created templates 500a-500e in a non-transitory medium in the network switch device 300. In other embodiments, the user of the network switch device 300 may view the pre-set attributes 504 for each of the templates (e.g., through a screen of the input device that is communicatively coupled to the network switch device 300). Also, in other embodiments, the user of the network switch device 300 may be allowed to modify the set of attributes 504 that is associated with one or more templates 500.

Also, as shown in the illustrated example, the entry groups 510 in the template 500a may have different configurations. For example, entry groups 510a-510e are illustrated as each having 256 entries, and entry group 510f is illustrated as having 128 entries. In other embodiments, the number of available entries for an entry group 510 may be different from the examples shown.

In the illustrated embodiments, the templates 500a-500e have different respective configurations. For example, the template 500b is indicated as having the attribute 504 "mac" available, while such attribute 504 is not available for the template 500a. Also, each of the first four entry groups 510c in the left column for the template 500b has 128 entries, while on the other hand, each of the first four entry groups 510a in the left column for the template 500a has 256 entries. In addition, some of the entry groups 510i, 510j for template 500d, 500e have zero entries. Furthermore, the template 500b has some entry groups 510 (e.g., entry group 510g) that are "double wide" with 128 entries, and entry groups 510 (e.g., entry group 510h) that are "double wide" with 256 entries. On the other hand, all of the entry groups in the left and right columns in the template 500a is "single wide". A "double wide" entry group has entries that are longer than the entries in a "single wide" entry group. Thus, a double wide entry may allow a user to input more information regarding a desired network processing rule than a single wide entry. In other embodiments, an entry group may be "triple wide" or "quadruple wide". A "triple wide" entry group has entries that are longer than the entries in a "double wide" entry group, and a "quadruple wide" entry group has entries that are longer than the entries in a "triple wide" entry group.

As shown in the figure, each template 500 has two columns. The left column has an identification "MT", which stands for multi-tool maps. The right column has an identification "ST", which stands for single-tool maps, and an identification "Filter", which stands for network port filters. In some embodiments, multi-tool maps utilize VLAN stage field processor (VFP) and VLAN stage TCAM resources from the network component 380, while single-tool maps and network port filters utilize the ingress stage field processor (IFP) and ingress stage TCAM resources from the network component 380. In other words, the left and right columns in each template 500 reflect two separate field processor hardware resources. Because they are independent, they may be partitioned/configured independent of each other. For example, the hardware resources for the left column may stay in "ipv4" template, while the hardware resources for the right column may transition from the "ipv4" to "ipv6". That means in some embodiments, at any point in time, there may be two templates being used, e.g., one for MT, and one for ST/filter. In other embodiments, each template 500 may have one column or more than two columns. Also, in other embodiments, if a template 500 has multiple columns for different categories of input, the different categories of input (columns) may be categorized based on other parameter(s) other than hardware resources.

As shown in the above examples, the different templates 500a-500e may have different respective sets of available attributes 504, different types of entry groups 510, different combination of entry groups 510, and/or different total number of entries. Also, as shown in the illustrated examples, in each template 500, the entry groups 510 include a combination of one or more items: (1) an entry group with a single wide configuration and 128 entries, (2) an entry group with a single wide configuration and 256 entries, (3) an entry group with a double wide configuration and 128 entries, (4) an entry group with a double wide configuration and 256 entries, and (5) an entry group with zero entry. The combinations of the entry group items are different for the different respective templates 500a-500e.

In some embodiments, each of the templates 500a-500e may be created by associating certain attributes 504 thereto, and by prescribing a certain combination of entry group items for the template. For example, the template 500a may be created by associating a number of attributes 540 thereto (see the "X" items indicating a list of attributes 540 for the template 500a). Also, as shown in the illustrated example, a combination of four entry groups (each having a single wide configuration and 256 entries) are prescribed for the template 500a. In some embodiments, the associated attributes 504 and the combination of entry group items created for a particular template may be stored in a non-transitory medium inside the network switch device 300.

In some embodiments, any of the templates 500a-500e may be used by a user of the network switch device 300 to configure a network component (e.g., the component 380) in a switch device 300.

Returning to FIG. 2, next, the network switch device 300 receives an input regarding a desired attribute to be considered in a network process (Item 404). In some embodiments, the configuring of the network component 380 may be performed using an input device (e.g., a computer, a handheld device, etc.) that is communicatively coupled to the network switch device 300 (e.g., to the network component 380). In such cases, the input device may provide a user interface for allowing a user to enter input for configuring the network component 380. The input device then transmits the input to the network switch device 300. In some embodiments, the input from the input device may be one or more commands (e.g., instruction(s)) that specify or indicate the type of network processing desired by the user. For example, the user may enter an instruction to indicate that ipv6 processing is desired. Alternatively, the user may enter an instruction to indicate a particular desired action that involves ipv6 processing. In such cases, the network switch device 300 (e.g., a module in the network switch device 300, which may be a processor running on software) may be configured to automatically determine that ipv6 processing is needed. In some embodiments, the module in the network switch device 300 that processes the received input and accesses the templates 500a-500e may be implemented using hardware (e.g., a processor), software, or combination of both.

After the input has been received by the network switch device 300, the network switch device 300 (e.g., the module therein) then selects one of the templates 500a-500e for configuring the network component 380 based on the received input (Item 406). In the illustrated embodiments, the selection of the template by the network switch device 300 (e.g., by the module in the network switch device 300) may be performed automatically by considering the set of available attributes 504 in the template. For example, the module in the network switch device 300 may be configured to determine one of the templates 500a-500e with the set of available attributes 504 that can satisfy the network processing requirement imposed by the received input. In one implementation, the module selects one of the templates 500a-500e with the set of available attributes 504 that includes the desired attribute involved in the received input.

In some embodiments, during use, if a user enters an instruction for an entry in one of the entry groups, the network switch device 300 (e.g., a module therein, which may be a processor running on software) may determine the attribute involved with the instruction, and may determine if a current template used by the user includes the attribute. In some embodiments, if the attribute involved with the user's instruction, together with all of the attributes from the previously entered instructions at other entries, are included with the current template, the module in the network switch device 300 will then continue to let the user use the current template. In other embodiments, if the attribute involved with the newly entered instruction by the user is not included with the current template, the module in the network switch device 300 will then attempt to select another one of the templates 500 that includes the required attribute, and that includes all of the other attributes from the previously entered instructions at other entries. If the attempt is successful, the module may automatically select and switch to the new template 500. If the attempt is unsuccessful, the module may then display a message to inform the user that the instruction cannot be entered.

In some cases, the user of the network switch device 300 may initially be interested in configuring the network switch device 300 to perform only ipv4 processing. In such cases, the module in the network switch device 300 may initially set template 500a as the default template for allowing configuring of the network component 380. Then later on, the user of the network switch device 300 may be interested in configuring the network switch device 300 to perform additional function(s) that are ipv6 processing. For example, when the user is programming the network switch device 300, the user may attempt to enter a network processing function that involves ipv6 processing. When this happens, the module in the network switch device 300 may automatically access (i.e., in response to receiving the network processing function entered by the user) the templates 500a-500e stored therein, and selects one of the templates 500a-500e for configuring the network component 380 to perform ipv6 processing. In the illustrated example, the module of the network switch device 300 may select the template 500e for the user because the template 500e includes attributes 504a that are suitable for ipv6 processing. The template 500e also includes a set of attributes 504b that are in common with those in the template 500a for ipv4 processing. Thus, instructions entered in entries using the template 500a previously may also be programmed to the network component 380 using the template 500e (provided that they are from the right column of the template 500a). On the other hand, template 500a has a set of attributes 504c that are no longer available from the template 500e. So if there are instructions entered in entries in the left column of template 500a, those instructions would not be able to be programmed to the network component 380 using the template 500e. In such cases, the module in the network switch device 300 may display a message to inform the user.

After the new template 500e has been selected, the module of the network switch device 300 may also automatically transfer network processing functions that were previously defined (pre-defined) by the user for ipv4 processing to the entries for the selected template 500e. For example, in the original template 500a (source template), the user may have previously defined 4 network processing functions that were entered into the first 4 entries in the first entry group 510 (e.g., at the left column) for the source template 500a. When the new template 500e has been selected, the module of the network switch device 300 may automatically transfer the previously entered 4 entries from the first entry group 510 for the source template 500a to the first 4 entries in the entry group 510 (e.g., at the left column) for the selected template 500e. Thus, in some embodiments, an order of the information from the entries for the source template 500a may be maintained when being transferred to the entries for the selected template 500e.

In some embodiments, the information from the entries in the source template may be from an entry group 510 having a configuration that is different from the entry group 510 in the selected template to which the information is transferred. For example, the information may be transferred from entries in an entry group 510 (for the source template) with a single wide configuration to entries in an entry group (for the selected template) with a double wide configuration, or vice versa. In other embodiments, the information may be transferred from entries in an entry group 510 (for the source template) with a first total number of entries to entries in an entry group (for the selected template) with a second total number of entries that is different from the first total number. For example, the information may be transferred from entries in an entry group 510 (for the source template) with 128 entries, to entries in an entry group (for the selected template) with 256 entries, or vice versa. In further embodiments, the information may be transferred from entries in an entry group 510 (for the source template) that has one of the following configurations: a single wide configuration with 128 entries, a single wide configuration with 256 entries, a double wide configuration with 128 entries, and a double wide configuration with 256 entries, and the entry group 510 in the selected template that receives the information may also have one of the above configurations, but different from that in the source template. In further embodiments, the source template and the selected template may have the same single/double wide configuration with 128/256 entries, but the selected template may have one or more attributes that are different from the source template.

After the pre-defined network processing functions have been transferred to the selected template 500e, the module of the network switch device 300 may also automatically add the new network processing function entered by the user to the next available entry immediately following the entries that were just populated by the transferred information, so that there is no gap therebetween. Such technique is advantageous because it ensures that there is no empty entry 512 in each of the entry groups 510 that are used to configure the network component 380. In particular, in the non-template based technique in which the network component 380 may be configured to perform certain type (e.g., ipv4) of processing, when the user desires to add a new network function that belongs to a different type of processing, the programming of the network component 380 may involve automatically placing the new network function in a new entry group. However, such technique may result in wasting all of the remaining entries in the first entry group that have not been used.

Figure 4:
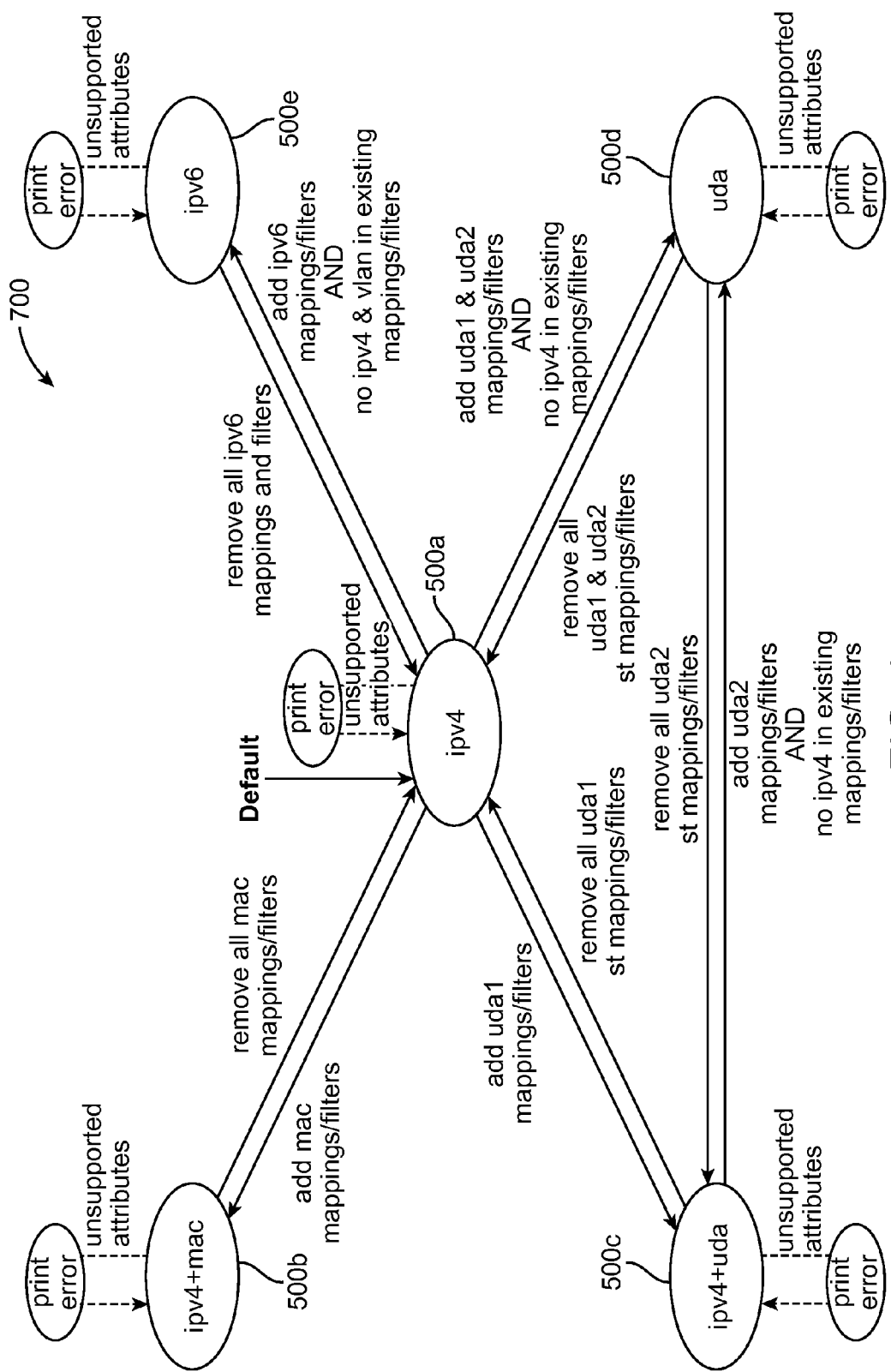
FIG. 4 illustrates a map showing how different configuration states may be transitioned to and from each other.

As illustrated in the above examples, the module in the network switch device 300 may be configured to automatically select one of the templates 500 for configuring the network component 380. For example, the default template used may be template 500a for ipv4 processing, and the module may later automatically switch to template 500e (e.g., in response to an input from the user) if ipv6 processing is desired. FIG. 4 illustrates an example of a map 700 showing how different configuration states (for configuring the network component 380) as provided by different respective templates 500 may be transitioned to and from each other. The map 700 applies to the right column of each template 500 (i.e., the "St/filter" column). However, in other embodiments, there may be another map that applies to the left column of each template 500. In the illustrated embodiments, the module in the network switch device 300 starts with template 500a as the default template. Thus, the user who is configuring the network component 380 may enter different desired network functions to the entries for the template 500a as long as they are all supported by the attributes 504 associated with the template 500a. If later on, the user wishes to enter a network function related to ipv6 processing, the module than transitions the configuration state from template 500a to the template 500e. In some embodiments, such transitioning may involve adding ipv6 mapping or filter(s) using the template 500e. If later on, the user wishes to go back to ipv4 processing, the module may then transition the configuration state from template 500e back to the template 500a. In such cases, the module may remove all ipv6 mappings and filters.

Similarly, suppose that the source template is "ipv4" template 500a and the selected template is "uda" template 500d, then "no ipv4 in existing mappings/filters" as indicated in the map 700 of FIG. 4 means that there cannot be any network processing rule having IPv4 source address or IPv4 destination address since these attributes are not available in the selected "uda" template 500d. Thus, if a user wishes to create a network processing rule that involves UDA1 and UDA2, then s/he must first clear all network processing rules that include IPv4 source address or IPv4 destination address.

The other possible transitions from and to other templates 500 are also shown in the figure. It should be noted that the map 700 is just an example of the transitioning paths between different templates 500, and that other transitioning paths may be implemented in other embodiments. For example, in other embodiments, the templates 500d, 500e may be allowed to transition to and from each other. Also, in other embodiments, the action items involved in the transitioning from one template to another may be different from those shown in the figure.

It should be noted that the configuration of the templates 500 is not limited to the examples shown, and that the templates 500 may have other configurations in other embodiments. FIG. 5 illustrates another set of templates 500a-500d that may be used to program the network component 380 in accordance with some embodiments.

Also, the above technique for configuring the network component 380 may be applied for configuring network component that is a part of a network switch device having a different configuration from that shown in FIG. 1. In addition, in other embodiments, the above technique may be employed to configure a network component that may be a part of a motherboard, or a part of a chip.

Figure 6:
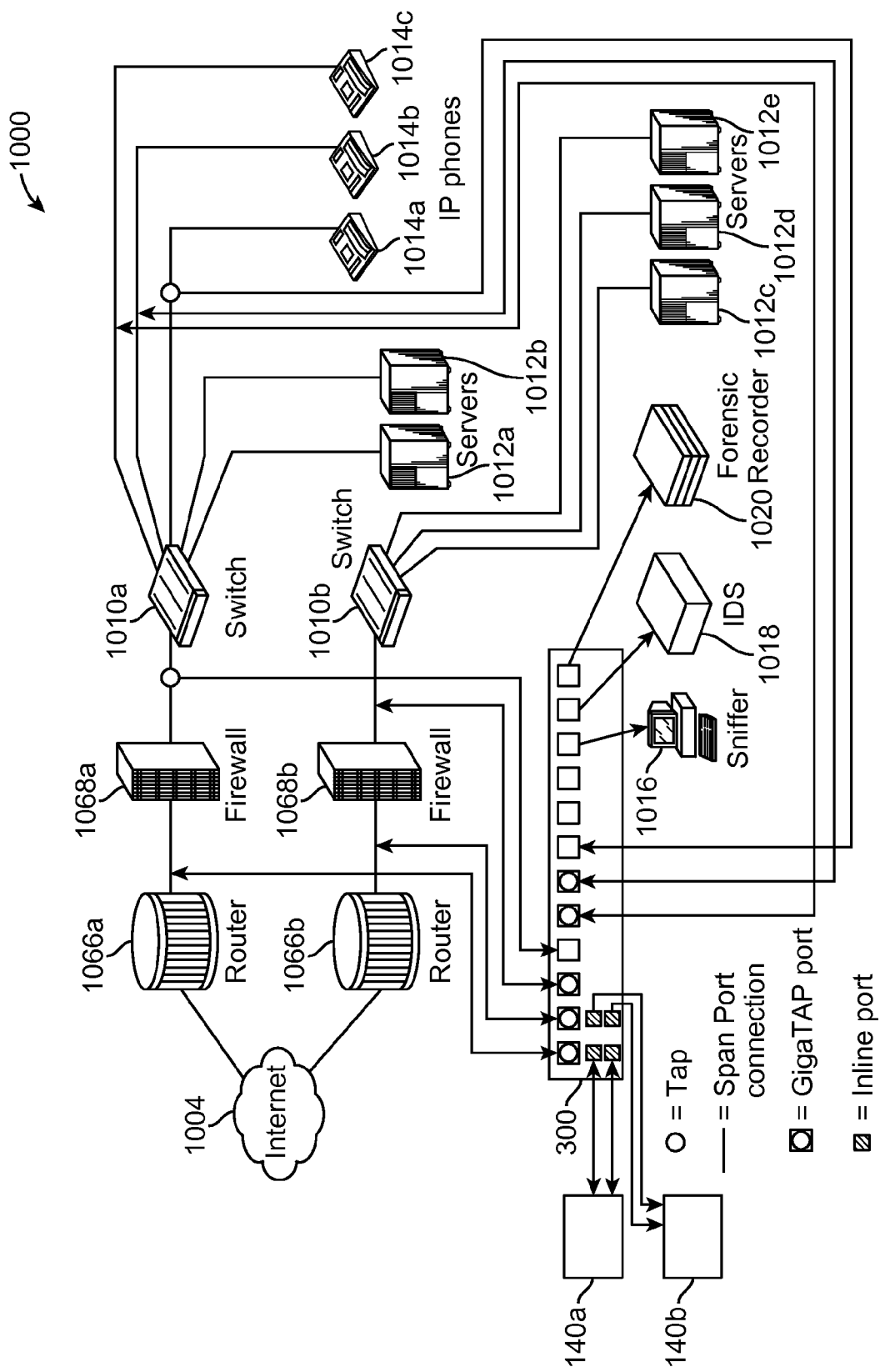
FIG. 6 shows an example of a deployment of the network switch device of FIG. 1 in a network environment in accordance with some embodiments.

FIG. 6 shows the deployment of the network switch device 300 in a network environment 1000 in accordance with some embodiments. The Internet 1004 is coupled via routers 1006a-b and firewalls 1068a-b to two switches 1010a and 1010b. Switch 1010a is coupled to servers 1012a-b and IP phones 1014a-c. Switch 1010b is coupled to servers 1012c-e. A sniffer 1016, an IDS 1018 and a forensic recorder 1020 (collectively, "non-pass through instruments") are coupled to the device 300. As illustrated in FIG. 6, there is a reduction on the number of non-pass through instruments in this deployment as compared to a conventional configuration (in which there may be one or more non-pass through instruments between router 1066a and firewall 1068a, one or more non-pass through instruments between firewall 1068a and switch 1010a, one or more non-pass through instruments between router 1066b and firewall 1068b, and firewall 1068b and switch 1010b) because the same non-pass through instruments can now access information anywhere in the network environment 1000 through the device 300. The user has complete flexibility to channel whatever traffic to whatever instrument or groups of non-pass through instruments, using the any-to-any, any-to-many and many-to-one capability of the system in accordance with the different embodiments described herein. For example, all the conversations of the IP phones 1014a-c can be easily configured to be sent to an IDS 1018. It is also possible that traffic inside a particular IP phone 1014a-c connection can be sent to a sniffer 1016, and Intrusion Detection System 1018 and a forensic recorder 1020 simultaneously via the one-to-many function.

In some embodiments, when using the device 300, one or more non-pass through instruments (such as IDS, sniffer, forensic recorder, etc.) may be connected to instrument port(s), and one or more pass through instruments 140a, 140b (e.g., IPS) may be connected to other instrument port(s) (e.g., inline port(s)). Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them, and then pass the packets downstream towards the intended recipient node). In some cases, by having both an IDS and an IPS connected to the device 300, the device 300 can compare whether the IDS or the IPS sees more threats, and/or can have a redundant protection such that if the IPS misses any threat, the IDS may pick it up.

Computer System Architecture

Figure 7:
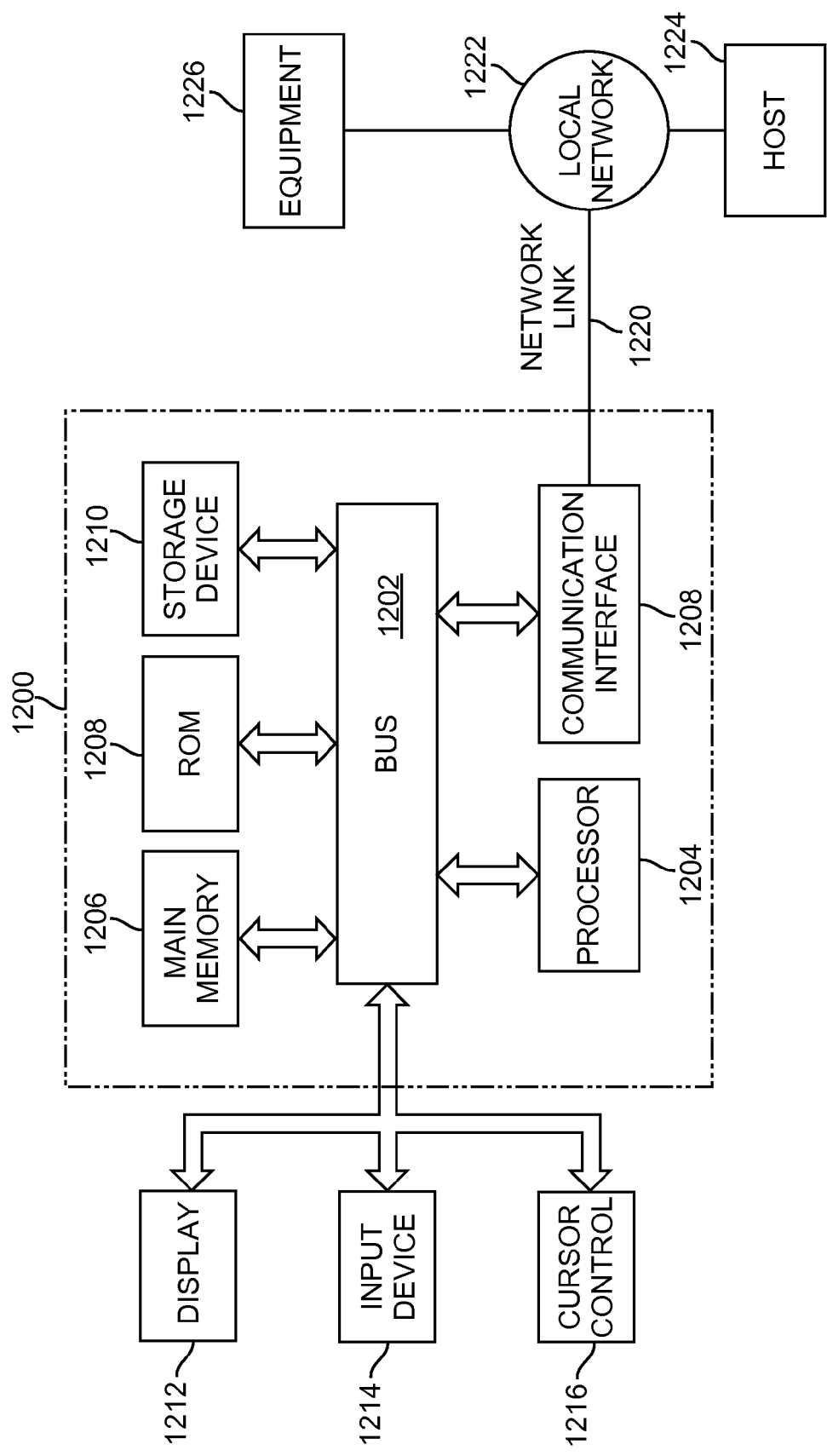
FIG. 7 illustrates an example of a computer system with which embodiments described herein may be implemented.

FIG. 7 is a block diagram that illustrates an embodiment of a computer system 1200 upon which embodiments described herein may be implemented. Computer system 1200 includes a bus 1202 or other communication mechanism for communicating information, and a processor 1204 coupled with the bus 1202 for processing information. The processor 1204 may be used to perform various functions described herein. For example, in some embodiments, the processor 1204 may receive input from a user for configuring a network component (e.g., the component 380).

The computer system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The computer system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The computer system 1200 may be coupled via the bus 1202 to a display 1212, such as a cathode ray tube (CRT), for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The computer system 1200 may be used for performing various functions in accordance with the embodiments described herein. According to one embodiment, such use is provided by computer system 1200 in response to processor 1204 executing one or more sequences of one or more instructions contained in the main memory 1206. Such instructions may be read into the main memory 1206 from another computer-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement features of the embodiments described herein. Thus, embodiments described herein are not limited to any specific combination of hardware circuitry and software.

The term "computer-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. A non-volatile medium may be considered to be an example of a non-transitory medium. Volatile media includes dynamic memory, such as the main memory 1206. A volatile medium may be considered to be another example of a non-transitory medium. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the computer system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The computer system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the computer system 1200, are exemplary forms of carrier waves transporting the information. The computer system 1200 can send messages and receive data, including program code, through the network (s), the network link 1220, and the communication interface 1218.

It should be noted that when a "packet" is described in this application, it should be understood that it may refer to the original packet that is transmitted from a node, or a copy of it.

It should be noted that the term "first" (as in "first packet", "first entry", "first entry group", for examples), and the term "second" (as in "second packet", "second entry", "second entry group", for examples), are used to refer to different things, and do not necessarily refer to the order of things. Thus, the term "first template" does not necessarily refer to a template that is "first" in order, and may refer to any template that is different from a "second" template. Similarly, the term "second template" does not necessarily refer to a template that is "second" in order, and may refer to any template that is different from a "first" template.

Although particular embodiments have been shown and described, it will be understood that they are not intended to limit the present inventions, and it will be obvious to those skilled in the art that various changes and modifications may be made without departing from the spirit and scope of the claimed inventions. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed:

1. A method for use in a process to configure a network component, comprising:
  providing a plurality of templates, each of which is selectable for assisting a user to configure the network component, wherein each of the templates has a set of available attributes associated thereto and includes a plurality of entry groups, one of the entry groups in one of the templates including a value indicating a maximum number of a plurality of entries that are available for allowing network processing rules involving one or more of the attributes to be entered;
  receiving an input regarding a desired attribute to be considered in a network process; and
  selecting a template from the plurality of templates based on the received input, wherein the act of selecting is performed using a processor.

2. The method of claim 1, wherein one of the templates is a source template, wherein one of the entries that is associated with the source template has a pre-defined network processing rule, the source template being different from the selected template; and
  wherein the method further comprises automatically transferring the pre-defined network processing rule from the one of the entries that is associated with the source template to one of the entries associated with the selected template.

3. The method of claim 1, wherein one of the templates is a source template, wherein some of the entries that are associated with the source template have pre-defined network processing rules, the source template being different from the selected template; and
  wherein the method further comprises automatically transferring the pre-defined network processing rules from the some of the entries that are associated with the source template to some of the entries associated with the selected template.

4. The method of claim 3, wherein an order of the pre-defined network processing rules is maintained when the pre-defined network processing rules are transferred to the some of the entries that are associated with the selected template.

5. The method of claim 3, further comprising adding an additional network processing rule to one of the entries that is associated with the selected template.

6. The method of claim 5, wherein the additional network processing rule is incapable of being entered or processed based on the source template from which the pre-defined network processing rules are transferred.

7. The method of claim 5, wherein the one of the entries associated with the selected template to which the additional network processing rule is added immediately follows the entries to which the pre-defined network processing rules are transferred, so that there is no entry gap there-between.

8. The method of claim 3, wherein:
  the some of the entries associated with the source template from which the pre-defined network processing rules are transferred are associated with one of the entry groups for the source template, the one of the entry groups for the source template prescribing a first configuration of entries to be available;
  the entries to which the pre-defined network processing rules are transferred are associated with one of the entry groups for the selected template, the one of the entry groups for the selected template prescribing a second configuration of entries to be available; and
  the first configuration is different from the second configuration.

9. The method of claim 8, wherein:
  the first configuration is one of a single wide configuration, a double wide configuration, a triple wide configuration, and a quadruple wide configuration, and the second configuration is another one of the single wide configuration, the double wide configuration, the triple wide configuration, and the quadruple wide configuration.

10. The method of claim 8, wherein the entry group prescribing the first configuration of entries to be available prescribes a total number of entries to be available that is different from a total number of entries prescribed to be available by the entry group prescribing the second configuration of entries to be available.

11. The method of claim 8, wherein each of the first configuration and the second configuration is selected from the group consisting of 128 entries in a single wide configuration, 256 entries in a single wide configuration, 128 entries in a double wide configuration, and 256 entries in a double wide configuration.

12. The method of claim 8, wherein the entry group prescribing the first configuration of entries to be available prescribes 128 entries to be available, and the entry group prescribing the second configuration of entries to be available prescribes 256 entries to be available, or vice versa.

13. The method of claim 1, wherein
the one of the entry groups prescribes (1) 128 entries in a single wide configuration to be available, (2) 256 entries in a single wide configuration to be available, (3) 128 entries in a double wide configuration to be available, (4) 256 entries in a double wide configuration to be available, or (5) zero entry to be available.

14. The method of claim 1, wherein the act of selecting the template from the plurality of templates comprises selecting the template with the set of available attributes that includes the desired attribute.

15. The method of claim 1, wherein the entry groups for one of the templates has a configuration that is different from a configuration of the entry groups for another one of the templates.

16. The method of claim 1, wherein a total number of the entries prescribed to be available by one of the templates is different from a total number of the entries prescribed to be available by another one of the templates.

17. The method of claim 1, wherein the set of the available attributes for one of the templates has one or more available attributes that are different from the set of the available attributes for another one of the templates.

18. The method of claim 1, wherein the network component comprises a ternary content-addressable memory.

19. The method of claim 1, wherein the network component comprises a field processor.

20. The method of claim 1, wherein the network component comprises a network card.

21. The method of claim 1, wherein the network component comprises a StrataXGS device.

22. The method of claim 1, wherein the network component is configured to perform packet filtering, packet routing, packet switching, packet mirroring, packet aggregation, or a combination of the foregoing.

23. The method of claim 1, wherein the network component is a part of a network appliance that is configured to receive packets and transmits the packets to one or more instrument ports.

24. The method of claim 1, wherein the attributes for each of the template comprise one or more of ipv4, ipv6, mac, uda1, uda2, vlan, portdst, portsrc, ethertype, ipver, protocol, dscp, tos, tcpctl, ipfr, ttl, and ip6fl.

25. The method of claim 1, wherein the act of selecting is performed automatically by the processor.

26. An apparatus for use in a process to configure a network component, comprising:
a non-transitory medium storing a plurality of templates, each of which is selectable for configuring the network component, wherein each of the templates has a set of available attributes associated thereto and includes a plurality of entry groups, one of the entry groups in one of the templates including a value indicating a maximum number of a plurality of entries that are available for allowing network processing rules involving one or more of the attributes to be entered; and
a processor configured for receiving an input regarding a desired attribute to be considered in a network process, and selecting a template from the plurality of templates based on the received input.

27. The apparatus of claim 26, wherein one of the templates is a source template, wherein one of the entries that is associated with the source template has a pre-defined network processing rule, the source template being different from the selected template; and
wherein the processor is further configured for automatically transferring the pre-defined network processing rule from the one of the entries that is associated with the source template to one of the entries associated with the selected template.

28. The apparatus of claim 26, wherein one of the templates is a source template, wherein some of the entries that are associated with the source template have pre-defined network processing rules, the source template being different from the selected template; and
wherein the processor is further configured for automatically transferring the pre-defined network processing rules from the some of the entries that are associated with the source template to some of the entries associated with the selected template.

29. The apparatus of claim 28, wherein the processor is configured to maintain an order of the pre-defined network processing rules when transferring the pre-defined network processing rules to the some of the entries that are associated with the selected template.

30. The apparatus of claim 28, wherein the processor is further configured for adding an additional network processing rule to one of the entries that is associated with the selected template.

31. The apparatus of claim 30, wherein the additional network processing rule is incapable of being entered or processed based on the source template from which the pre-defined network processing rules are transferred.

32. The apparatus of claim 30, wherein the one of the entries associated with the selected template to which the additional network processing rule is added immediately follows the entries to which the pre-defined network processing rules are transferred, so that there is no entry gap therebetween.

33. The apparatus of claim 28, wherein:
the some of the entries associated with the source template from which the pre-defined network processing rules are transferred are associated with one of the entry groups for the source template, the one of the entry groups for the source template prescribing a first configuration of entries to be available;
the entries to which the pre-defined network processing rules are transferred are associated with one of the entry groups for the selected template, the one of the entry groups for the selected template prescribing a second configuration of entries to be available; and the first configuration is different from the second configuration.

34. The apparatus of claim 33, wherein the first configuration is one of a single wide configuration and a double wide configuration, and the second configuration is the other one of the single wide configuration and the double wide configuration.

35. The apparatus of claim 33, wherein the entry group prescribing the first configuration of entries to be available prescribes a total number of entries to be available that is different from a total number of entries prescribed to be available by the entry group prescribing the second configuration of entries to be available.

36. The apparatus of claim 33, wherein each of the first configuration and the second configuration is selected from the group consisting of 128 entries in a single wide configuration, 256 entries in a single wide configuration, 128 entries in a double wide configuration, and 256 entries in a double wide configuration.

37. The apparatus of claim 33, wherein the entry group prescribing the first configuration of entries to be available prescribes 128 entries to be available, and the entry group prescribing the second configuration of entries to be available prescribes 256 entries to be available, or vice versa.

38. The apparatus of claim 26, wherein
the one of the entry groups prescribes (1) 128 entries in a single wide configuration to be available, (2) 256 entries in a single wide configuration to be available, (3) 128 entries in a double wide configuration to be available, (4) 256 entries in a double wide configuration to be available, or (5) zero entry to be available.

39. The apparatus of claim 26, wherein the processor is configured for selecting the template from the plurality of templates by selecting the template with the set of available attributes that includes the desired attribute.

40. The apparatus of claim 26, wherein the entry groups for one of the templates has a configuration that is different from a configuration of the entry groups for another one of the templates.

41. The apparatus of claim 26, wherein a total number of the entries prescribed to be available by one of the templates is different from a total number of the entries prescribed to be available by another one of the templates.

42. The apparatus of claim 26, wherein the set of the available attributes for one of the templates has one or more available attributes that are different from the set of the available attributes for another one of the templates.

43. The apparatus of claim 26, wherein the network component comprises a ternary content-addressable memory.

44. The apparatus of claim 26, wherein the network component is a part of a network appliance that is configured to receive packets and transmits the packets to one or more instrument ports.

45. The apparatus of claim 26, wherein the attributes for each of the template comprise one or more of ipv4, ipv6, mac, uda1, uda2, vlan, portdst, portsrc, ethertype, ipver, protocol, dscp, tos, tcpctl, ipfr, ttl, and ip6fl.

46. The apparatus of claim 26, wherein the processor is configured for performing the act of selecting automatically.

47. A computer product having a non-transitory medium storing a set of instructions, an execution of which causes a process to be performed, the process comprising:
providing a plurality of templates, each of which is selectable for assisting a user to configure the network component, wherein each of the templates has a set of available attributes associated thereto and includes a plurality of entry groups, one of the entry groups in one of the templates including a value indicating a maximum number of a plurality of entries that are available for allowing network processing rules involving one or more of the attributes to be entered;
receiving an input regarding a desired attribute to be considered in a network process; and
selecting a template from the plurality of templates based on the received input, wherein the act of selecting is performed using a processor.

48. The computer product of claim 47, wherein one of the templates is a source template, wherein one of the entries that is associated with the source template has a pre-defined network processing rule, the source template being different from the selected template; and
wherein the process further comprises automatically transferring the pre-defined network processing rule from the one of the entries that is associated with the source template to one of the entries associated with the selected template.

49. The computer product of claim 47, wherein one of the templates is a source template, wherein some of the entries that are associated with the source template have pre-defined network processing rules, the source template being different from the selected template; and
wherein the process further comprises automatically transferring the pre-defined network processing rules from the some of the entries that are associated with the source template to some of the entries associated with the selected template.

50. The computer product of claim 49, wherein an order of the pre-defined network processing rules is maintained when the pre-defined network processing rules are transferred to the some of the entries that are associated with the selected template.

51. The computer product of claim 49, wherein the process further comprises adding an additional network processing rule to one of the entries that is associated with the selected template.

52. The computer product of claim 51, wherein the additional network processing rule is incapable of being entered or processed based on the source template from which the pre-defined network processing rules are transferred.

53. The computer product of claim 51, wherein the one of the entries associated with the selected template to which the additional network processing rule is added immediately follows the entries to which the pre-defined network processing rules are transferred, so that there is no entry gap therebetween.

54. The computer product of claim 49, wherein:
the some of the entries associated with the source template from which the pre-defined network processing rules are transferred are associated with one of the entry groups for the source template, the one of the entry groups for the source template prescribing a first configuration of entries to be available;
the entries to which the pre-defined network processing rules are transferred are associated with one of the entry groups for the selected template, the one of the entry groups for the selected template prescribing a second configuration of entries to be available; and
the first configuration is different from the second configuration.

55. The computer product of claim 54, wherein the first configuration is one of a single wide configuration and a double wide configuration, and the second configuration is the other one of the single wide configuration and the double wide configuration.

56. The computer product of claim 54, wherein the entry group prescribing the first configuration of entries to be available prescribes a total number of entries to be available that is different from a total number of entries prescribed to be available by the entry group prescribing the second configuration of entries to be available.

57. The computer product of claim 54, wherein each of the first configuration and the second configuration is selected from the group consisting of 128 entries in a single wide configuration, 256 entries in a single wide configuration, 128 entries in a double wide configuration, and 256 entries in a double wide configuration.

58. The computer product of claim 54, wherein the entry group prescribing the first configuration of entries to be available prescribes 128 entries to be available, and the entry group prescribing the second configuration of entries to be available prescribes 256 entries to be available, or vice versa.

59. The computer product of claim 49, wherein
the one of the entry groups prescribes (1) 128 entries in a single wide configuration to be available, (2) 256 entries in a single wide configuration to be available, (3) 128 entries in a double wide configuration to be available, (4) 256 entries in a double wide configuration to be available, or (5) zero entry to be available.

60. The computer product of claim 47, wherein the act of selecting is performed automatically by the processor.

* * * * *